United States Patent [19]
Kiuchi et al.

[11] Patent Number: 5,338,062
[45] Date of Patent: Aug. 16, 1994

[54] SIDE COLLISION SENSOR SYSTEM FOR SIDE AIRBAG APPARATUS

[75] Inventors: Toru Kiuchi, Mishima; Kenji Ogata, Susono; Masakazu Chiba, Aichi; Toshiaki Matsuhashi, Gamagori; Masahiro Taguchi, Aichi; Motonori Tominaga, Okazaki, all of Japan

[73] Assignees: Toyota Jidosha Kabushiki Kaisha, Toyota; Nippondenso Co., Ltd., Kariya; Nippon Soken, Inc., Nishio, all of Japan

[21] Appl. No.: 942,822

[22] Filed: Sep. 10, 1992

[30] Foreign Application Priority Data

Sep. 11, 1991 [JP] Japan ................. 3-259639

[51] Int. Cl.⁵ .................................. B60R 21/32
[52] U.S. Cl. ........................ 280/735; 180/274; 180/282
[58] Field of Search ............. 280/735, 730 A, 728; 180/274, 282

[56] References Cited

U.S. PATENT DOCUMENTS

| | | | |
|---|---|---|---|
| 3,741,584 | 6/1973 | Arai | 280/735 |
| 4,366,465 | 12/1982 | Veneziano | 280/735 |
| 4,836,024 | 1/1989 | Woehrl et al. | 290/735 |
| 4,851,705 | 7/1989 | Musser et al. | 180/282 X |
| 4,966,388 | 10/1990 | Warner et al. | 280/730 |
| 5,072,966 | 12/1991 | Nishitake et al. | 280/730 |
| 5,081,587 | 1/1992 | Okano | 280/735 |
| 5,172,790 | 12/1992 | Ishikawa et al. | 280/735 |
| 5,173,614 | 12/1992 | Woehrl et al. | 180/282 |
| 5,194,755 | 3/1993 | Rhee et al. | 280/735 |
| 5,202,831 | 4/1993 | Blackburn et al. | 280/735 |
| 5,234,228 | 8/1993 | Morota et al. | 280/735 |

FOREIGN PATENT DOCUMENTS

| | | |
|---|---|---|
| 0292669 | 11/1988 | European Pat. Off. |
| 0342401 | 11/1989 | European Pat. Off. |
| 4128608 | 3/1992 | Fed. Rep. of Germany |
| 57-53953 | 9/1955 | Japan |
| 2155862 | 6/1990 | Japan |
| 8911986 | 12/1989 | PCT Int'l Appl. |
| 9006247 | 6/1990 | PCT Int'l Appl. |

*Primary Examiner*—Brian L. Johnson
*Assistant Examiner*—Christopher P. Ellis
*Attorney, Agent, or Firm*—Cushman, Darby & Cushman

[57] ABSTRACT

A side collision sensor system for a side airbag apparatus for inflating an airbag between a side door or inner side wall and a passenger of a vehicle, when a transverse collision is detected, to protect the passenger against a secondary collision. The side collision sensor system comprises: a side collision sensor arranged on the side of a vehicle body for outputting a collision detection signal, if it is compressed by a force of a predetermined or higher strength; and an acceleration sensor attached to an arbitrary portion of the vehicle body for outputting a collision detection signal if an acceleration applied sideways to the vehicle body has a predetermined or higher level. The side airbag is inflated if at least one of the side collision sensor and the acceleration sensor outputs its collision detection signal.

18 Claims, 9 Drawing Sheets

SIDE COLLISION SENSOR SYSTEM FOR SIDE AIRBAG APPARATUS

BACKGROUND OF THE INVENTION

1. Field of the Invention

The present invention relates to a side airbag apparatus for protecting a passenger, at the time of a transverse collision of a vehicle, against a secondary collision and, more particularly, to a side collision sensor system for inflating an airbag by detecting the side collision.

2. Description of the Prior Art

An airbag to be expanded for protecting a passenger at the time of a transverse collision or the like of a vehicle is inflated with gas which is generated by an inflater forming part of the airbag apparatus, for example. Especially, an electric airbag apparatus is equipped with electric sensors including pressure sensitive sensors and/or contact sensors. These sensors output signals if they detect a collision. In response to the signals, a gas generating agent in the inflater is ignited to generate a mass of gas instantly. This gas fills up and inflates the airbag abruptly so that the airbag is expanded between the passenger and the inner side wall such as the side door inner face of a vehicle compartment to protect the passenger against a secondary collision.

For example, FIG. 9 shows one example of the side airbag apparatus of the prior art, as disclosed in U.S. Pat. No. 4,966,388. This apparatus has a side airbag 101 confined in a folded state inside of the side door or the like at the side face of a vehicle. At the time of a side collision, an inflater 102 is ignited to generate gas, which inflates the side airbag 101 so that the side airbag 101 is expanded in the space between the a driver D and the inner face of a side door 103.

The side airbag 101 of the prior art is fixed together with the inflater 102 on a backup plate 104, which in turn is mounted on an inner panel or the like in the side door 103 and has its compartment inner side covered removably with a trim cover 105. In the side airbag apparatus thus constructed, therefore, a side collision sensor 106 elongated fully to the door width in the side door 103 ignites the inflater 102 if it is partially compressed and turned ON at the time of a side collision. Then, the side airbag 101 is inflated with the gas generated from the inflater 102 and is expanded to a predetermined position, while opening the trim cover 105 forcibly into the compartment, to protect a driver against a secondary collision.

In short, in this side airbag apparatus, the side airbag 101 is attached to a predetermined position in each side door 103. In the same side door 103, there is also mounted the side collision sensor 106 for detecting a side collision by having its contacts connected when compressed. If this vehicle body has its side door 103 hit by another vehicle, the side collision sensor 106 in the side door 103 is turned ON so that the side airbag 101 is inflated in response to the signal of the side collision sensor 106 to protect the passenger.

In the side airbag apparatus of the prior art thus far described, however, the side collision sensor 106 in the side door 103 cannot detect a side collision, if this side collision takes place in a portion of the side face of the vehicle body other than the side door 103, namely, in the side portion of a front fender or a rear fender, which is not equipped with the side collision sensor 106. In case of this collision, therefore, the side airbag 101 is left uninflated. Since, however, the vehicle body receives a high transverse load even in case of the side collision at the front or rear fender, the driver D is also pushed sideways on his seat by the inertial load of the side collision of this kind. In this case, too, the driver has to be protected against the secondary collision by inflating the airbag 101. If the vehicle body has its side hit near the front or rear end so that it is turned or spun, the position of the airbag to be expanded is different because the direction of the inertial load to be exerted upon the driver is different depending upon the position of its spinning center and the position of the driver.

SUMMARY OF THE INVENTION

A major object of the present invention is to detect a side collision properly even in case a vehicle body is hit at its side portion of a front or rear fender which is not arranged with a side collision sensor.

Another object of the present invention is to prevent an airbag from being uselessly expanded at the time of no collision.

According to the present invention, therefore, there is provided a side collision sensor system for a side airbag apparatus for inflating an airbag between a side door or inner side wall and a passenger of a vehicle, when a collision sensor detects a transverse collision, to protect the passenger against a secondary collision, which system comprises: a side collision sensor arranged on the side of a vehicle body for outputting an ON signal to inflate the airbag, if it receives a force of a predetermined or higher strength; and acceleration/deceleration detecting means attached to an arbitrary portion of the vehicle body for outputting an ON signal to inflate the airbag, if an acceleration or deceleration applied sideways to the vehicle body and received thereby has a predetermined or higher level.

The side collision sensor system further comprises a control unit for inflating the airbag if it receives at least one of the ON signals of the side collision sensor and the acceleration/deceleration detecting means.

The above and further objects and novel features of the present invention will more fully appear from the following detailed description when the same is read in connection with the accompanying drawings. It is to be expressly understood, however, that the drawings are for the purpose of illustrations only and is not intended as a definition of the limits of the invention.

DETAILED DESCRIPTION OF THE PREFERRED EMBODIMENTS

The side collision sensor system for the side airbag apparatus according to the present invention will be specifically described with reference to the accompanying drawings.

Figure 1:
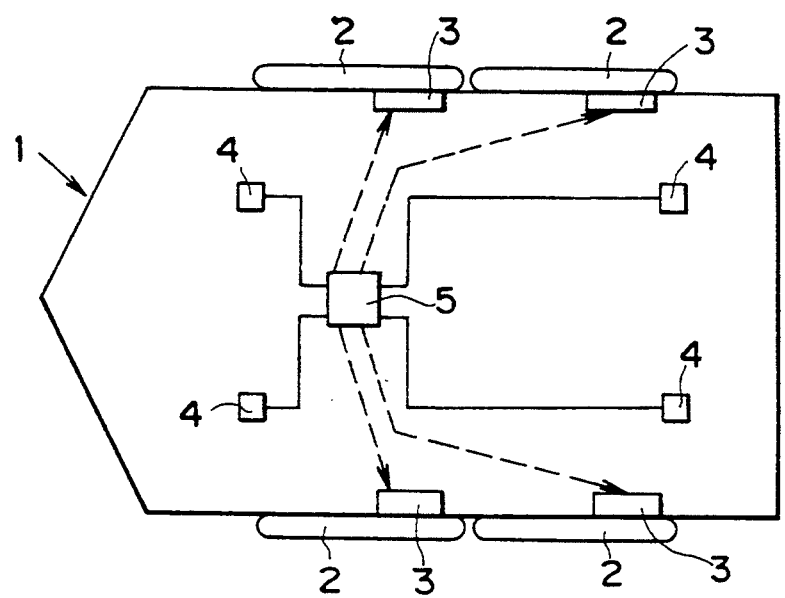
FIG. 1 is a schematic diagram showing a side collision sensor system for a side airbag apparatus according to the present invention.

As shown in FIG. 1, a vehicle body 1 is equipped in each of the side doors at the two sides with a side collision sensor 2 which is elongated fully to the door width, and in the compartment inner side of each side with a side airbag 3. At arbitrary portions close to the front and rear of the vehicle body, respectively, there are arranged at a predetermined spacing a pair of acceleration sensors 4 which are individually connected with a control unit 5 for feeding ignition signals to the inflaters of the individual side airbags 3.

If, moreover, either or both of the side collision sensors 2 and the acceleration sensors 4 are turned ON, the side airbag or airbags 3 at the necessary position or positions are inflated. The transmission pattern of the signals for inflating the side airbags of this side collision sensor system will be specifically described in the following in connection with embodiments.

Figure 2:
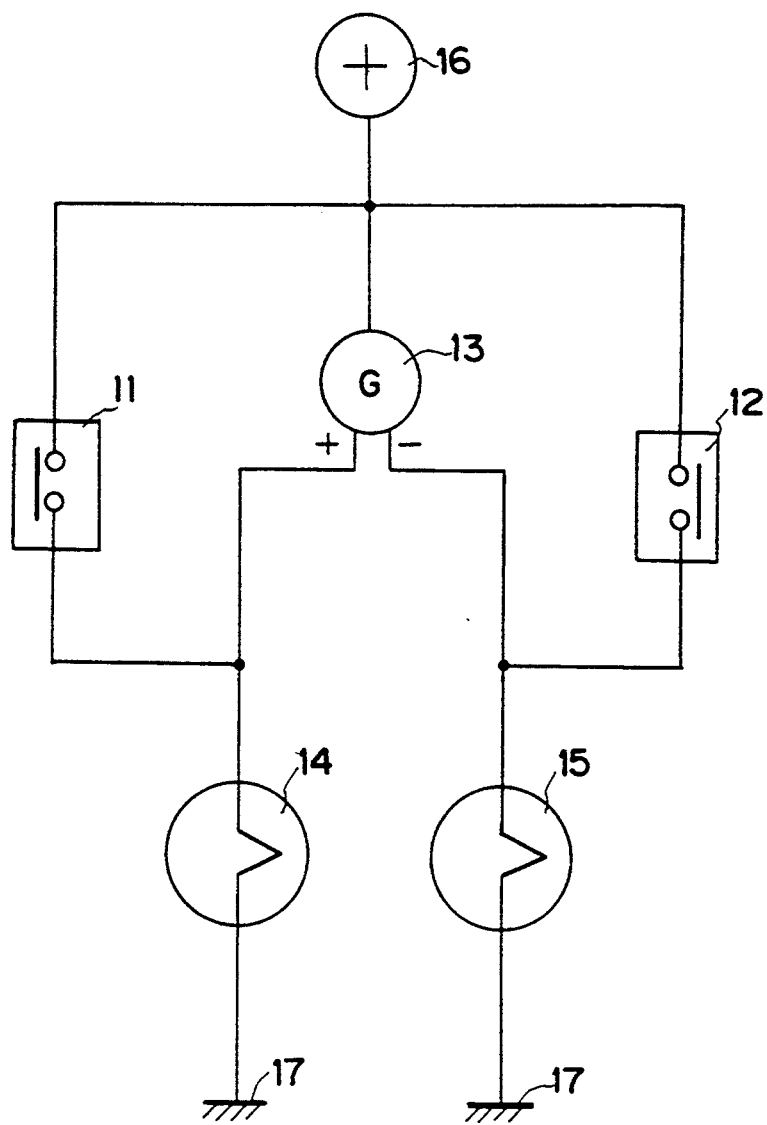
FIG. 2 is a signal transmission diagram showing a first embodiment of the side collision sensor system for the side airbag apparatus according to the present invention.

FIG. 2 shows a signal transmission lineage of a first embodiment of the present invention. This side collision sensor system is applied to side airbag apparatus for a driver's seat and a navigator's seat of a two-door car. The side collision sensor system is equipped with in the two side doors with lefthand and righthand side collision sensors 11 and 12, which are elongated fully to the door width, and with an acceleration sensor 13 which is mounted at a rear portion on the center line of the car body, for example. This acceleration sensor 13 is to be turned ON if it detects an acceleration or deceleration of a predetermined or higher level in the transverse direction of the car body. Moreover: reference numeral 14 appearing in FIG. 2 designates a squib or ignition plug for the inflater of the lefthand side airbag mounted in the lefthand side door; numeral 15 designates a squib for the inflater of the righthand side airbag mounted in the righthand side door; numeral 16 designates a DC power source; and numeral 17 designates a body earth.

Next, the operations of this embodiment will be described in the following. If the lefthand side door is hit by a vehicle, for example, the lefthand side collision sensor 11 detects the side collision and is turned ON. Then, the squib 14 of the lefthand side airbag is fed with the electric power to ignite the inflater so that the lefthand side airbag is inflated with gas generated. If the righthand side door is hit by a vehicle, on the other hand, the righthand side collision sensor 12 likewise detects the side collision and is turned ON. Then, the squib 15 of the righthand side airbag is fed with the electric power to ignite the inflater so that the righthand side airbag is inflated with the gas generated.

If a position apart from the righthand or lefthand side door, such as a front or rear fender side face, is hit by a vehicle, this collision cannot be detected by the lefthand and righthand side collision sensors 11 and 12. In this case, however, the acceleration sensor 13 detects a transverse acceleration or deceleration of a predetermined or higher level. If the acceleration detected comes from the lefthand of the car body, a plus (+) detection signal is outputted to energize the squib 14 so that the inflater is ignited to generate gas thereby to inflate the lefthand side airbag. If the acceleration detected comes from the righthand of the car body, a minus (−) detection signal is outputted to energize the squib 15 so that the inflater is ignited to generate gas thereby to inflate the righthand side airbag. Thus, only the side airbag that is arranged in the direction for the passenger to be pushed or forced by the inertial load can be properly inflated if any of the side collision sensors 11 and 12 and the acceleration sensor 13 is turned ON.

Figure 3:
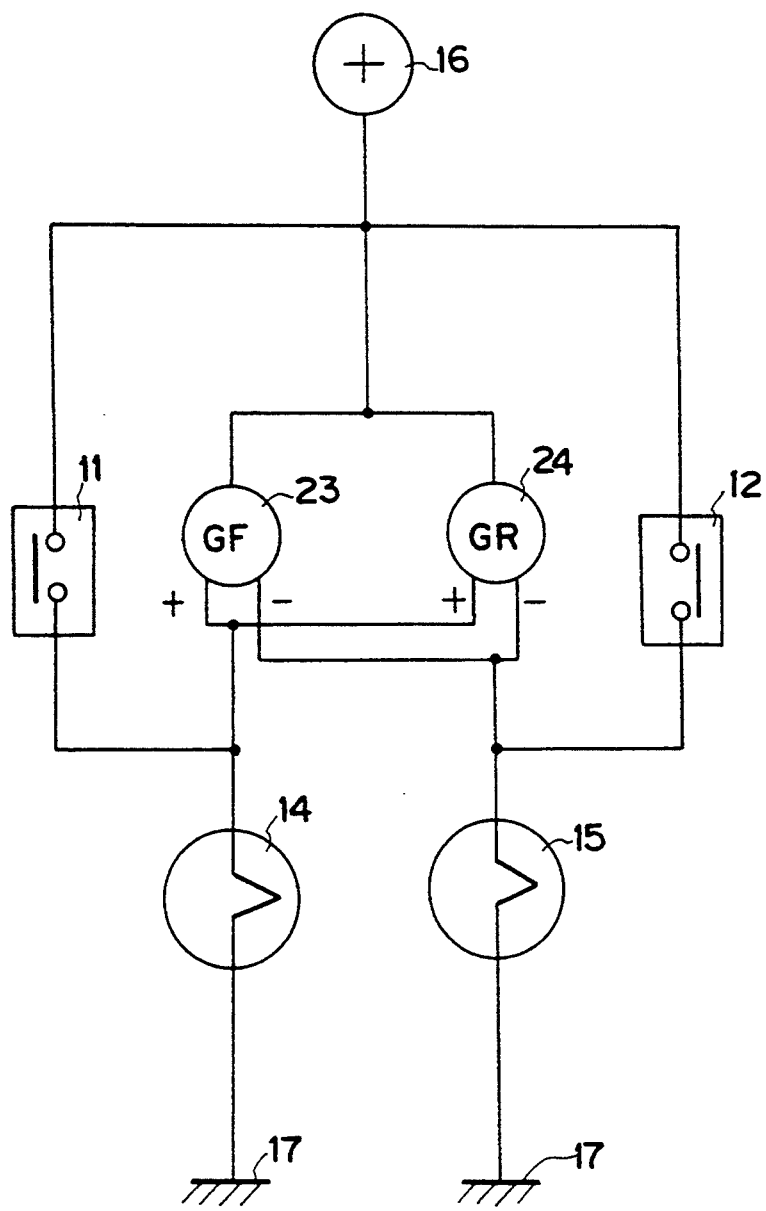
FIG. 3 is a signal transmission diagram showing a second embodiment of the same.

On the other hand, FIG. 3 shows a signal transmission lineage of a second embodiment of the present invention. This side collision sensor system is constructed by adding a front acceleration sensor 23 to those of the foregoing first embodiment. The components shared with the first embodiment will be described with the common reference numerals.

This side collision sensor system is applied to side airbag apparatus for a driver's seat and a navigator's seat of a two-door car. This system is equipped: in the two side doors with the lefthand and righthand side collision sensors 11 and 12, which are elongated fully to the door width; with the front acceleration sensor 23 which is mounted near the front portion on the center line of the car body; and with a rear acceleration sensor 24 which is mounted near the rear portion. These two acceleration sensors 23 and 24 are individually turned ON if they detect a transverse acceleration or deceleration of a predetermined or higher level.

Next, the operations of this embodiment will be described in the following. If the lefthand side door is hit by a vehicle, for example, the lefthand side collision sensor 11 detects the side collision and is turned ON. Then, the squib 14 of the lefthand side airbag is fed with the electric power to ignite the gas generating agent in the inflater so that the lefthand side airbag is inflated with the gas generated. If the righthand side door is hit by a vehicle, on the other hand, the righthand side collision sensor 12 detects the side collision and is turned ON like the foregoing embodiment. Then, the squib 15 of the righthand side airbag is fed with the electric power to ignite the inflater so that the righthand side airbag is inflated with the gas generated.

If, moreover, a position apart from the righthand or lefthand side door, such as a front or rear fender side face, is hit by a vehicle, this collision cannot be detected by the lefthand and righthand side collision sensors 11 and 12. In this case, therefore, any of the front acceleration sensor 23 and the rear acceleration sensor 24 detects a transverse acceleration or deceleration of a predetermined or higher level. If the acceleration or deceleration detected comes from the lefthand of the car body, a plus (+) detection signal is individually outputted to energize the squib 14 so that the lefthand side airbag is inflated. If the acceleration or deceleration detected comes from the righthand of the car body, a minus (−) detection signal is individually outputted to energize the squib 15 so that the righthand side airbag is inflated with the gas generated by the ignited inflater.

The sensor system according to this embodiment is equipped with the two acceleration sensors, i.e., the front acceleration sensor 23 and the rear acceleration sensor 24. Thus, even if the car body has its front fender hit and is spun so that either of the acceleration sensors takes a position close to the spinning center of the car body, the other acceleration sensor never fails to retain its position apart from the spinning center so that an acceleration of a predetermined or higher acceleration can be sensed to detect the side collision properly. Moreover, only the side airbag that is arranged in the direction for the passenger to be pushed or forced by the inertial load can be properly inflated if any of the side collision sensors 11 and 12 and the acceleration sensors 23 and 24 is turned ON.

If both the acceleration sensors 23 and 24 are turned ON as a result of one collision, the squib 14 and/or the squib 15 are energized in combination of the signals of the sensors 23 and 24. In case, for example, both the two signals of the sensors 23 and 24 are plus or minus, the squib 14 or 15 is energized like the case of a single signal so that the airbag at one of the lefthand and righthand sides is inflated by the generated gas. If, on the other hand, one of the two signals of the sensors 23 and 24 is plus whereas the other is minus, one of the following operations is performed. That is: the airbags at the righthand or lefthand side different for the front and rear seats are inflated in accordance with the spinning direction of the car body; all the side collision airbags at the lefthand and righthand sides are inflated independently of the spinning direction of the car body; a stronger signal is preferred so that the airbags at the side of the inputting direction of the stronger signal are inflated; or the signal inputted at first is preferred so that the bags at the side of the inputting direction of the first signal are inflated.

Figure 4:
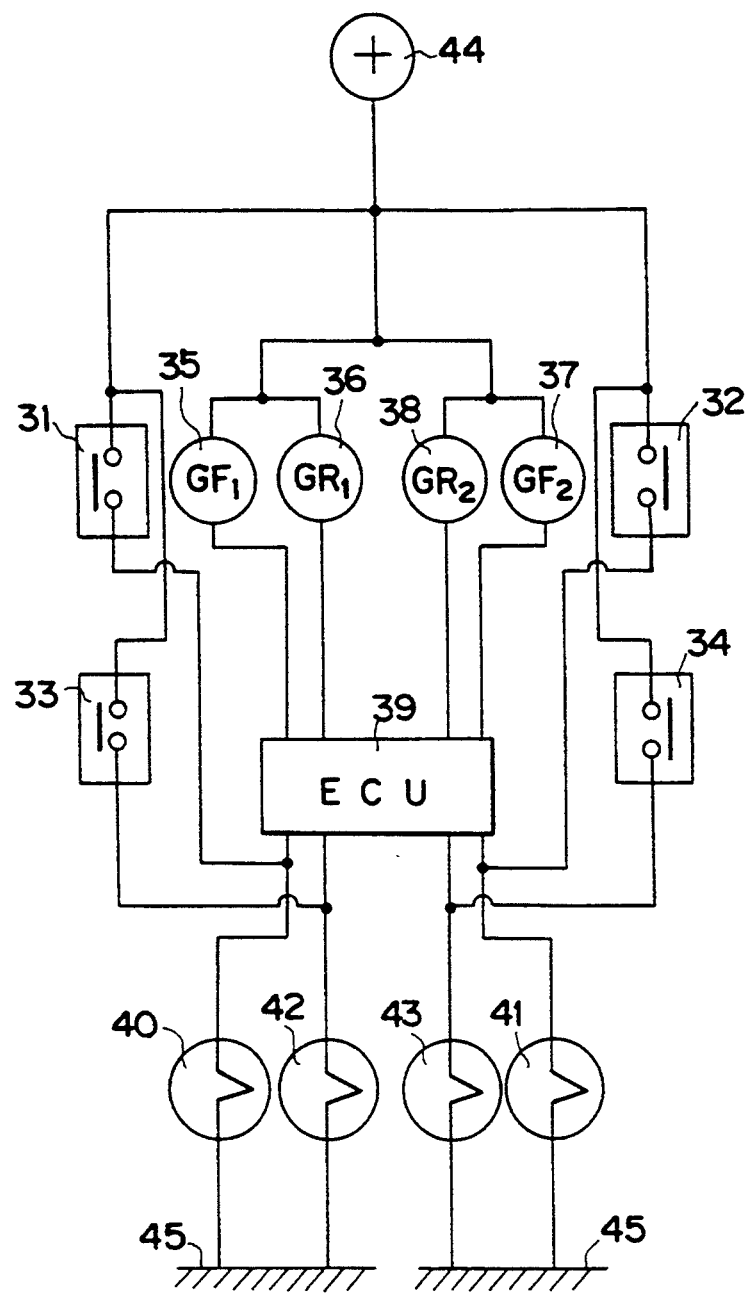
FIG. 4 is a signal transmission diagram showing a third embodiment of the same.

Moreover, FIG. 4 shows a signal transmission lineage of a third embodiment of the present invention. This side collision sensor system is applied to side airbag apparatus for the driver's seat, the navigator's seat and the rear seats of the two sides of a four-door car. This system is equipped in the individual lefthand and righthand front doors with lefthand and righthand front side collision sensors 31 and 32, which are elongated fully to the door width, and in the individual lefthand and righthand rear doors with lefthand and righthand rear side collision sensors 33 and 34 which are likewise elongated. The system is further equipped with four acceleration sensors 35, 36, 37 and 38, each of which can detect an acceleration or deceleration in only one of the leftward and rightward directions. Moreover, the acceleration sensor 35 is arranged at the lefthand side of the front of the car body so that it can detect an acceleration or deceleration from the lefthand side only, and the acceleration sensor 36 is arranged at the lefthand side of the rear portion of the car body so that it can detect an acceleration or deceleration from the lefthand side only. Still moreover, the acceleration sensor 37 is arranged at the righthand side of the front of the car body so that it can detect an acceleration or deceleration from the righthand side only, and the acceleration sensor 38 is arranged at the righthand side of the rear of the car body so that it can detection an acceleration or deceleration from the righthand side only.

The signals to be outputted when the individual acceleration sensors 35, 36, 37 and 38 detect accelerations or decelerations of predetermined or higher levels are inputted to an electronic control unit 39. These signals ignite one or two or more squibs 40, 41, 42 and 43 selectively to inflate such side airbags arranged in the doors at the individual side faces of the driver's seat and the navigator's seat and at the two sides of the rear seats, as are positioned for the passenger or passengers to be pushed or forced by the inertial load. In FIG. 4, numeral 44 designates a DC power source, and numeral 45 designates a body earth.

Next, the operations of the embodiment thus constructed will be described in the following. If the lefthand front door is hit by a vehicle, for example, the lefthand front side collision sensor 31 detects the side collision and is turned ON. Then, the squib 40 for the lefthand front airbag is energized to ignite the inflater so that the lefthand front side airbag is inflated with the gas generated. If, on the other hand, the righthand rear door is hit by a vehicle, the righthand rear side collision sensor 34 likewise detect the side collision and is turned ON. Then, the squib 43 for the righthand rear airbag is energized to ignite the inflater so that the righthand rear side airbag is inflated with the gas generated.

If, on the other hand, the car is hit at its portion outside of the lefthand and righthand front and rear doors, e.g., at its lefthand rear fender side face so that its body is spun on its front end, both the lefthand front acceleration sensor 35 and the lefthand rear acceleration sensor 36 detects an acceleration or deceleration from the lefthand of the car body. Then, the detected signals are inputted to the electronic control unit 39 to energize the squibs 40 and 42 so that the lefthand front side airbag and the lefthand rear side airbag are inflated with the gas generated by the corresponding inflaters, thereby to protect the passenger or passengers against a secondary collision.

If, on the other hand, the car has its lefthand front fender side face hit so that its body is spun on its substantial center, the lefthand front acceleration sensor 35 and the righthand rear acceleration sensor 38 individually detect the acceleration or deceleration so that their detected signals are inputted to the electronic control unit 39. Then, this electronic control unit 39 energizes the squibs 40 and 43 so that the lefthand front side airbag and the righthand rear side airbag are individually inflated to protect the passenger or passengers against a secondary collision.

Figure 5:
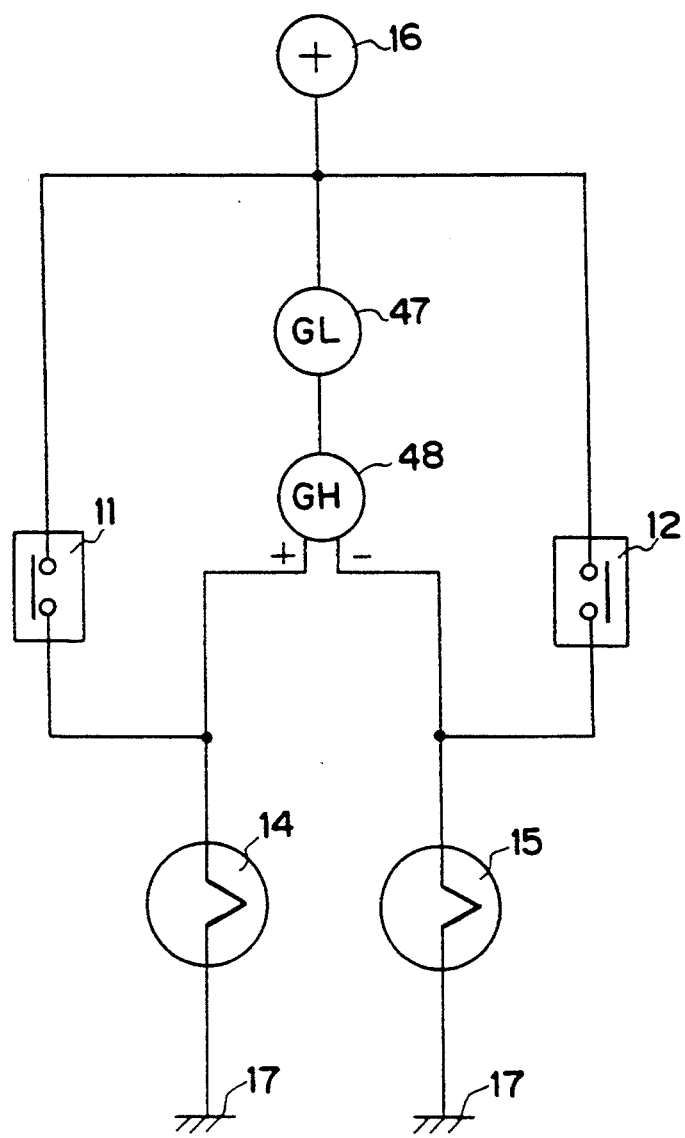
FIG. 5 is a signal transmission diagram showing a fourth embodiment of the same.

Moreover, FIG. 5 shows a signal transmission lineage of a fourth embodiment of the present invention. This side collision sensor is modified from the foregoing first embodiment by increasing the single acceleration sensor to two: a more sensitive acceleration sensor 47 and a less sensitive acceleration sensor 48. This fourth embodiment will be described by designating the components shared with the first embodiment at the identical reference numerals.

This side collision sensor system is applied to side airbag apparatus for the driver's seat and the navigator's seat of a two-door car and is equipped in the two side doors with the lefthand side collision sensor 11 and the righthand side collision sensor 12, which are elongated fully to the door width. The side collision sensor system is further equipped generally on the center line of the car body with the more sensitive acceleration sensor 47 for detecting even a low acceleration or deceleration and the less sensitive acceleration sensor 48 for detecting an acceleration or deceleration of a predetermined or higher level. These acceleration sensors 47 and 48 are connected in series with each other. Moreover, the less sensitive acceleration sensor 48 is enabled, only if the more sensitive acceleration sensor 47 earlier detects an acceleration or deceleration transverse of the car body and is turned ON, to detect the magnitude and direction of acceleration or deceleration by itself.

Next, the operations of this embodiment will be described in the following. If a lefthand side door is hit, for example, the lefthand side collision sensor 11 is turned ON to detect the side collision thereby to inflate the lefthand side airbag. If a righthand side door is hit, on the other hand, the righthand side collision sensor 12 is turned ON to detect the side collision thereby to inflate the righthand side airbag. Thus, the driver or passenger is protected against a secondary collision.

If, moreover, a front fender side face or a rear fender side face outside of the lefthand and righthand side doors is hit by a vehicle, the lefthand and righthand side collision sensors 11 and 12 cannot detect the collision. In this case, therefore, the more sensitive acceleration sensor 47 earlier detects the acceleration or deceleration from the lefthand side of the car body and is turned ON, and the less sensitive acceleration sensor 48 subsequently detects the acceleration to output its plus (+) detection signal so that the squib 14 is energized to inflate the lefthand airbag. If, on the other hand, the less sensitive acceleration sensor 48 detects an acceleration from the righthand side of the car body, it outputs its minus (−) detection signal to energize the squib 15 so that the righthand side airbag is inflated with the gas generated by the inflater.

Thus, the sensor system of this embodiment can have its reliability improved in its prevention of erroneous explosion because the two more and less sensitive acceleration sensors 47 and 48 are connected in series with each other.

Figure 6:
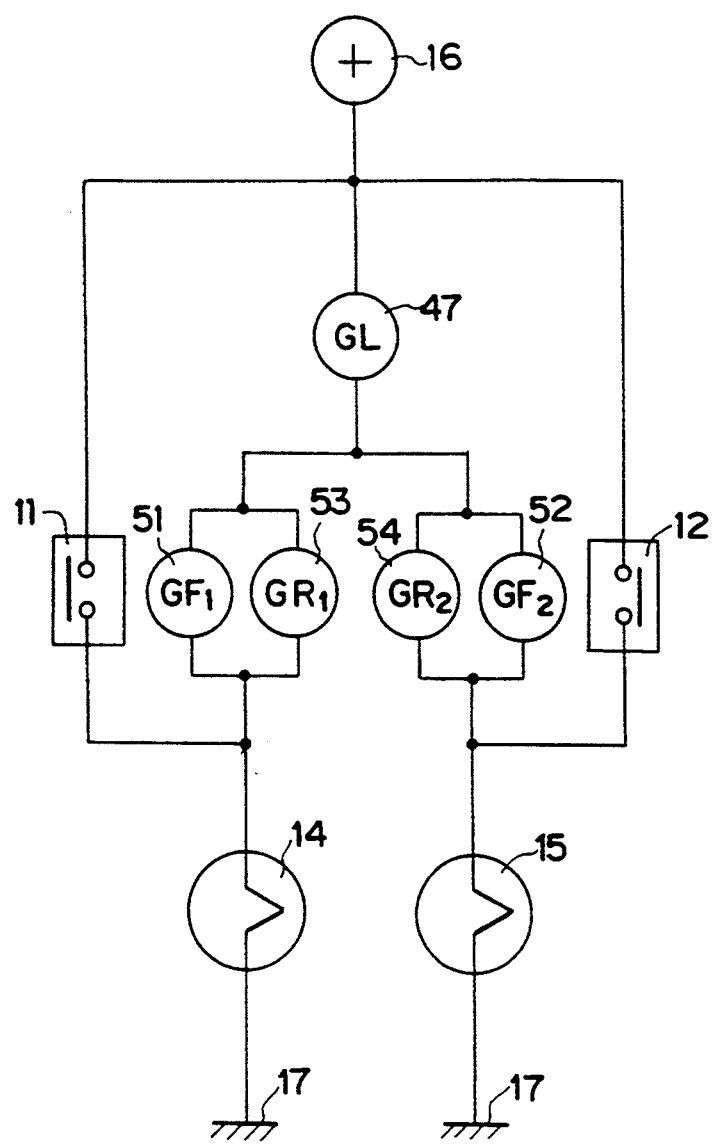
FIG. 6 is a signal transmission diagram showing a fifth embodiment of the same.

Moreover, FIG. 6 shows a signal transmission lineage of a fifth embodiment of the present invention. This side collision sensor system is modified from the foregoing fourth embodiment by using four less sensitive acceleration sensors each capable of detecting an acceleration or deceleration in only one direction in place of the single less sensitive acceleration sensor of the fourth embodiment and by arranged the two less sensitive acceleration sensors at the front and rear of the car body. The fifth embodiment will be described by designating the components shared with the fourth embodiment at the common reference numerals.

This side collision sensor system is one which is applied to side airbag apparatus for the driver's seat and the navigator's seat of a two-door car. The side collision sensor system is equipped in the two side doors with the lefthand and righthand side collision sensors 11 and 12 which are elongated fully to the door width. Moreover, the more sensitive acceleration sensor 47 is connected with four less sensitive acceleration sensors 51, 52, 53 and 54. Of these, the less sensitive acceleration sensor 51 is arranged close to the lefthand front of the car body, and the less sensitive acceleration sensor 52 is arranged close to the righthand front. Thus, the less sensitive acceleration sensor 51 can detect an acceleration or deceleration from the lefthand side of the car body only, and the less sensitive acceleration sensor 52 can detect an acceleration or deceleration from the righthand side of the car body only.

On the other hand, the less sensitive acceleration sensors 53 and 54 are individually arranged close to the rear of the car body, and the less sensitive acceleration sensor 53 can detect an acceleration or deceleration from the lefthand side of the car body only whereas the less sensitive acceleration sensor 54 can detect an acceleration or deceleration from the righthand side of the car body only. Moreover, these less sensitive acceleration sensors 51, 52, 53 and 54 are enabled to detect the magnitudes and directions of the accelerations or decelerations by themselves only if the more sensitive acceleration sensor 47 earlier detects an acceleration or deceleration from the lefthand or righthand side of the car body and is turned ON.

Next, the operations of this embodiment will be described in the following. If the lefthand side door is hit, for example, the lefthand side collision sensor 11 is turned ON to detect the side collision so that the lefthand side airbag is inflates. If the righthand side door is hit, on the other hand, the righthand side collision sensor 12 is turned ON to detect the side collision so that the righthand side airbag is inflated. Thus, the driver or navigator is protected against a secondary collision.

If the car has its portion outside of the lefthand or righthand side door such as its lefthand front fender side face hit by a vehicle, the more sensitive acceleration sensor 47 earlier detects a predetermined or higher acceleration and is turned ON. Then, the less sensitive acceleration sensor 51 arranged at the lefthand front portion detects the acceleration from the lefthand and is turned ON to ignite the squib 14 thereby to inflate the lefthand side airbag. If the lefthand rear fender side face is hit by a vehicle, the more sensitive acceleration sensor 47 likewise detects a predetermined or higher acceleration at an earlier stage and is turned ON. Then, the less sensitive acceleration sensor 53 arranged at the lefthand rear portion detects the acceleration from the lefthand and is turned ON to ignite the squib 14 thereby to inflate the lefthand side airbag. If the righthand front fender side face is hit by a vehicle, on the other hand, the more sensitive acceleration sensor 47 detects a predetermined or less sensitive acceleration and is turned ON. After this, the less sensitive acceleration sensor 52 arranged at the righthand front portion detects the acceleration from the righthand and is turned ON to ignite the squib 15 thereby to inflate the righthand side airbag.

Since the sensor system of this embodiment has its more sensitive acceleration sensor 47 and less sensitive acceleration sensors 51 to 53 connected in series, its reliability can be improved in the prevention of erroneous explosions of the airbags. Especially, the less sensitive acceleration sensors 51 to 54 are so mounted in the fenders or the like that they can detect a collision earlier, but the more sensitive acceleration sensor 47 is mounted in the central of the car body. At the time of a non-collision such as an outrage of hitting a fender of a parked car with a bat from the outside, the more sensitive acceleration sensor 47 mounted at the central of the car body is left inoperative and will not detect the acceleration or deceleration. Thus, even if the less sensitive acceleration sensors 51 to 54 should detect the acceleration or deceleration, the airbags can be prevented from being inflated.

Figure 7:
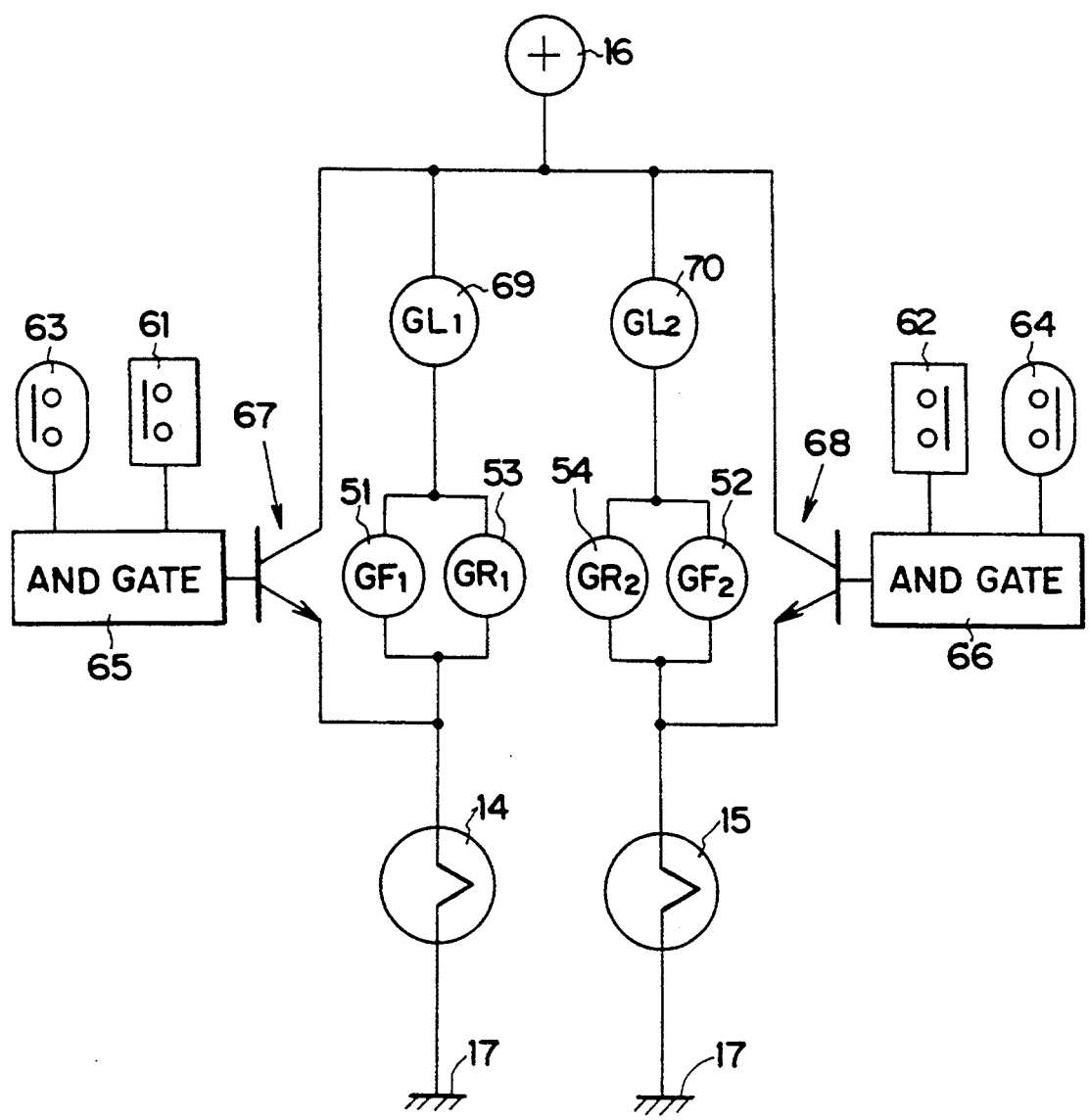
FIG. 7 is a signal transmission diagram showing a sixth embodiment of the same.

Moreover, FIG. 7 shows a signal transmission lineage of a sixth embodiment of the present invention. This side collision sensor system is modified from the foregoing fifth embodiment, in which the side airbags are unconditionally inflated if the lefthand and righthand side collision sensors individually detect a collision, such that the closures of the individual side doors are additional conditions for inflating the side airbags. The sixth embodiment will be described by designating the components shared with the fifth embodiment at the common reference numerals.

This side collision sensor system is applied to side airbag apparatus for the driver's seat and navigator's seat of a two-door car. The side collision sensor system is equipped in the two side doors with lefthand and righthand side collision sensors 61 and 62 which are elongated fully to the door width. The side collision sensor system is further equipped with a lefthand door switch 63 to be turned ON, if the lefthand side door is closed, and a righthand door switch 64 to be turned ON if the righthand side door is closed. These lefthand side collision sensor 61 and lefthand door switch 63 are individually connected with and AND gate 65 for deciding whether or not both of them 61 and 63 are turned ON. If this AND gate 65 detects that both the lefthand side collision sensor 61 and the lefthand door switch 63 are turned ON, it outputs a signal for inflating the lefthand side airbag. The signal thus outputted turns ON a power transistor 67 to ignite the squib 14 of the inflater for the lefthand side airbag so that the lefthand side airbag is inflated wth the gates generated in the inflater and is expanded between the inner face of the lefthand side door and the driver or the navigator.

Moreover, a lefthand more sensitive acceleration sensor 69 is mounted at the lefthand side of the car body, and a righthand more sensitive acceleration sensor 70 is mounted at the righthand side of the car body. Still moreover, the lefthand front less sensitive acceleration sensor 51 and the lefthand rear less sensitive acceleration sensor 53 are connected in series with the lefthand more sensitive acceleration sensor 69, and righthand front less sensitive acceleration sensor 52 and the righthand rear less sensitive acceleration sensor 54 are connected in series with the righthand more sensitive acceleration sensor 70. If either the lefthand front less sensitive acceleration sensor 51 or the lefthand rear less sensitive acceleration sensor 53 detects an acceleration or deceleration and is turned ON after the lefthand more sensitive acceleration sensor 69 has detected the acceration or deceleration and has been turned ON, the inflater for the lefthand side airbag has its squib 14 energized and ignited. If, on the other hand, the righthand more sensitive acceleration sensor 70 and the righthand front less sensitive acceleration sensor 52 or the righthand rear less sensitive acceleration sensor 54 are turned ON, the inflater for the righthand side airbag has its squib 15 energized and ignited. In FIG. 7, the reference numeral 16 designates a DC power source, and the numeral 17 designates a body earth.

Next, the operations of this embodiment will be described in the following. Let the case be considered, in which the lefthand side door is hit by a vehicle while it is being closed together with the righthand side door. When both the lefthand side collision sensor 61 and the left door switch 63 are turned ON, the AND gate 65 outputs a signal for inflating the lefthand side airbag. The signal thus outputted turns ON the power transistor 67 to ignite the squib 14 of the inflater for the lefthand side airbag of the side airbag apparatus so that the lefthand side airbag is inflated with the gas generated in the inflater and is inflated between the inner face of the lefthand side door and the driver or navigator to protect him against a secondary collision.

If, on the contrary, the lefthand side collision sensor 61 is compressed and turned ON with the side door being open, that is, if the lefthand side door is hit by an obstacle such as a utility pole when it is opened at the time of getting on and off the car, the AND gate 65 does not output any signal because the door switch 63 is OFF. As a result, the signal for inflating the side airbag is not outputted in that case. Thus, the squib 14 of the inflater is not ignited so that the side airbag can be prevented from being unnecessarily inflated or expanded.

If, moreover, the car has its portion outside of the lefthand or righthand side door such as its lefthand front fender side face hit by a vehicle, the lefthand more sensitive acceleration sensor 69 detects the acceleration and is turned ON, as in case of the foregoing fifth embodiment, and the less sensitive acceleration sensor 51 arranged at the lefthand front detects the acceleration from the lefthand and is turned ON to ignite the squib 14 thereby to inflate the lefthand side airbag. If, on the other hand, the lefthand rear fender side face is hit by a vehicle, the lefthand more sensitive acceleration sensor 69 also detects the acceleration and is turned on at an earlier stage. After this, the less sensitive acceleration sensor 53 arranged at the lefthand rear detects the acceleration from the lefthand and is turned ON to ignite the squib 14 so that the lefthand side airbag is inflated with the gas generated by the ignited inflater. If, on the other hand, the righthand front fender side face is hit by a vehicle, the righthand more sensitive acceleration sensor 69 detects the acceleration and is turned ON. After this, the less sensitive acceleration sensor 52 arranged at the righthand front detects the acceleration from the righthand and is turned ON to energize the squib 15 thereby to ignite the inflater so that the righthand side airbag is inflated with the generated gas to protect the driver or navigator against a secondary collision.

Thus, in this side collision sensor system, not only the side collision sensor 61 and 62 mounted in the lefthand and righthand side doors but also the door switches 63 and 64 to be turned ON when the side doors are closed are connected with the AND gates 65 and 66, respectively. Even if the side collision sensors 61 and 62 are ON, the AND gates 65 and 66 do not output any signal because the door switches 63 and 64 are OFF while the side doors are open. Thus, it is possible to prevent the side airbags from being unnecessarily inflated. Once the hit is decided as a non-collision even if the side collision sensors 61 and 62 are turned ON, the system has its side airbags left uninflated even if the side doors are closed with the side collision sensors 61 and 62 being ON.

Figure 8:
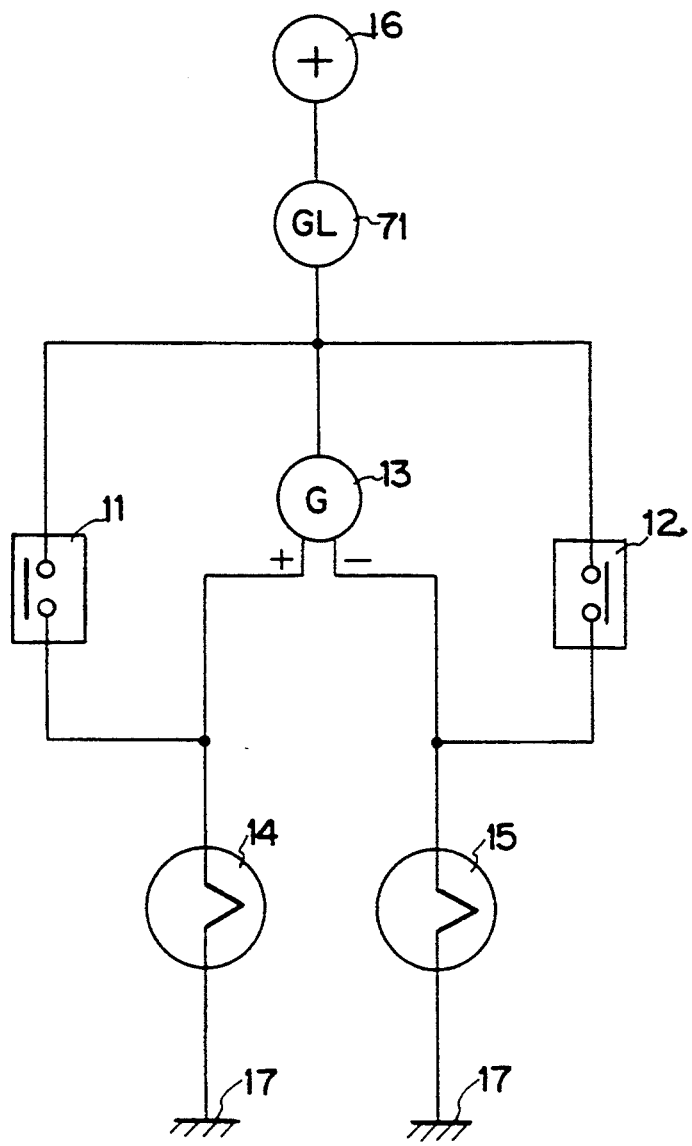
FIG. 8 is a signal transmission diagram showing a seventh embodiment of the same.
Figure 9:
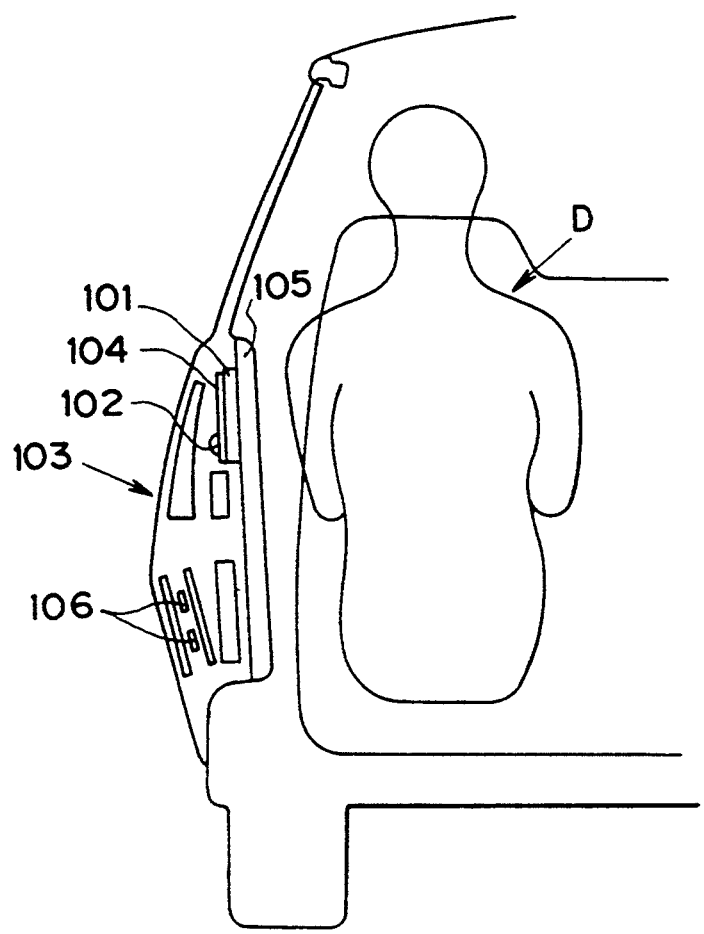
FIG. 9 is an explanatory diagram showing the arrangement of the side collision sensor of the side collision airbag of the prior art.

Moreover, FIG. 8 shows a signal transmission lineage of a seventh embodiment of the present invention for preventing the unnecessary inflations of the side airbags at the time of a non-collision. According to this embodiment, a more sensitive acceleration sensor 71 is additionally connected with the DC power source 16 of the sensor system of the foregoing first embodiment, which is composed of the lefthand side collision sensor 11, the righthand side collision sensor 12 and the acceleration sensor 13. Since the more sensitive acceleration sensor 71 is thus connected with the DC power source 16, the inflaters for the side airbags have their squibs 14 and 15 energized, if the side collision sensor 11 or 12 or the less sensitive acceleration sensor 13 is turned ON while the more sensitive acceleration sensor 71 is ON after it has detected a transverse acceleration. With the more sensitive acceleration sensor 71 having detected no acceleration, however, the squibs 14 and 15 are not ignited even if the side collision sensors 11 and 12 mounted in the side doors are compressed. Thus, the side airbags are not inflated in that situation.

As a result, the more sensitive acceleration sensor 71 is refrained from detecting any acceleration or deceleration at the time of a non-collision such as an impact, in which a side door of a parked car is struck from the outside, or a hit which is caused by an obstacle when a side door is opened. Thus, the side airbags can be prevented from being inflated even if the side collision sensors 11 and 12 are compressed.

Thus, the side collision sensor system is constructed to include: a side collision sensor arranged in the side face of a car body for outputting a signal, if compressed by a predetermined or higher force; and an acceleration sensor mounted in an arbitrary portion of the car body for outputting a signal, if an acceleration applied sideways to the car body is at a predetermined level or higher, so that a side airbag is inflated if at least one of the side collision sensor and the acceleration sensor outputs its signal. Even if that portion of the car body, which is not provided with the side collision sensor, is hit by a vehicle, this side collision can be detected without fail to inflate the corresponding side airbag properly thereby to protect the driver or passenger against any secondary collision.

What is claimed is:

1. A side collision sensor system for a side airbag apparatus for inflating an airbag between a side door or inner side wall and a passenger of a vehicle when a transverse collision is detected comprising:

a side collision sensor arranged on the side of a vehicle body for outputting a first ON signal only when said side collision sensor receives an external force of a predetermined or higher strength to inflate said airbag;

acceleration detecting means attached to an arbitrary portion of said vehicle body for outputting a second ON signal only when an acceleration of a predetermined or higher level is applied sideways to the vehicle body to inflate said airbag; and a control unit for inflating said airbag when the control unit receives at least either one of the ON signals of said side collision sensor and said acceleration detecting means.

2. A side collision sensor system according to claim 1, wherein said side collision sensor is arranged in said side door.

3. A side collision sensor system according to claim 2, wherein said side collision sensor is formed to have a length substantially equal to the width size of said side door.

4. A side collision sensor system according to claim 1, wherein said side collision sensor includes a contact sensor having contacts connected, if compressed, to detect a collision.

5. A side collision sensor system according to claim 1, wherein said side collision sensor includes a pressure sensitive sensor for detecting a collision if a compressive force received thereby reaches a predetermined or higher level.

6. A side collision sensor system according to claim 1, wherein said acceleration detecting means is arranged on the widthwise center line of said vehicle body.

7. A side collision sensor system according to claim 6, wherein said acceleration detecting means includes two acceleration sensors mounted at the front and rear of said vehicle body, respectively.

8. A side collision sensor system according to claim 1, wherein said acceleration detecting means includes a sensor for outputting a signal indicating the direction of an acceleration or deceleration.

9. A side collision sensor system according to claim 1, wherein said acceleration detecting means includes four sensors mounted on the lefthand and righthand of the front and rear of said vehicle body for each detecting an acceleration or deceleration from the right or left.

10. A side collision sensor system according to claim 6, wherein said acceleration detecting means includes a lower acceleration sensor of higher sensitivity and a higher acceleration sensor of lower sensitivity connected in series with each other.

11. A side collision sensor system according to claim 1, wherein said control unit includes means for outputting a collision detection signal if said side collision sensor is compressed and turned ON and if said acceleration sensor detects an acceleration of a predetermined or higher level.

12. A side collision sensor system according to claim 1, wherein said acceleration detecting means includes an acceleration sensor arranged at the front of the center of said vehicle body and another acceleration sensor arranged at the rear of the center of said vehicle body.

13. A side collision sensor system according to claim 12, wherein said front and rear acceleration sensors are arranged on the widthwise center line of said vehicle body.

14. A side collision sensor system according to claim 12, wherein said control unit includes means for inflating both lefthand and righthand airbags if said front and rear acceleration sensors individually output different rightward and leftward signals.

15. A side collision sensor system according to claim 12, wherein said control unit includes: means for indexing the spinning direction of said vehicle body, if said front and rear acceleration sensors output different rightward and leftward signals; and means for inflating lefthand and righthand airbags differently of front and rear seats in accordance with the spinning direction indexed.

16. A side collision sensor system according to claim 12, wherein said control unit includes means for preferentially inflating an airbag of the direction, in which a signal has a larger absolute value of the detected value, if said front and rear acceleration sensors individually output different rightward and leftward signals.

17. A side collision sensor system according to claim 12, wherein said control unit includes means for preferentially inflating an airbag of the direction, in which a first signal is inputted, if said front and rear acceleration sensors individually output different rightward and leftward signals.

18. A side collision sensor system according to claim 1 further comprising state detecting means for detecting the opened or closed state of a door, wherein said control unit includes an AND gate for outputting a collision detection signals if the AND gate receives an ON signal outputted from at least one of said side collision sensor and said acceleration sensor and if the AND gate receives a signal coming from said state detecting means indicating the closed state of said door.

* * * * *